United States Patent
Niyogi

(10) Patent No.: US 9,126,475 B2
(45) Date of Patent: Sep. 8, 2015

(54) AUTOMOBILE COVER

(71) Applicant: Shiladitya Niyogi, Buffalo Grove, IL (US)

(72) Inventor: Shiladitya Niyogi, Buffalo Grove, IL (US)

( * ) Notice: Subject to any disclaimer, the term of this patent is extended or adjusted under 35 U.S.C. 154(b) by 0 days.

(21) Appl. No.: 14/524,311

(22) Filed: Oct. 27, 2014

(65) Prior Publication Data

US 2015/0115647 A1    Apr. 30, 2015

Related U.S. Application Data

(60) Provisional application No. 61/895,853, filed on Oct. 25, 2013.

(51) Int. Cl.
*B60J 11/04* (2006.01)
*H05B 3/34* (2006.01)

(52) U.S. Cl.
CPC . *B60J 11/04* (2013.01); *H05B 3/34* (2013.01); *H05B 2214/02* (2013.01)

(58) Field of Classification Search
CPC ........ B60J 11/04; H05B 3/34; H05B 2214/02
USPC ............. 296/136.01, 136.02, 136.07, 136.08, 296/136.1, 136.12, 136.13

See application file for complete search history.

(56) References Cited

U.S. PATENT DOCUMENTS

| 4,886,083 | A | | 12/1989 | Gamache | |
|---|---|---|---|---|---|
| 5,490,707 | A | * | 2/1996 | De La Cruz | 296/95.1 |
| 5,738,403 | A | * | 4/1998 | Tyson | 296/136.02 |
| 2004/0178657 | A1 | * | 9/2004 | Tellez | 296/136.02 |
| 2005/0127710 | A1 | | 6/2005 | Rhea et al. | |
| 2009/0167049 | A1 | | 7/2009 | Lariviere | |
| 2011/0006049 | A1 | | 1/2011 | Thompson, Jr. | |
| 2012/0007385 | A1 | | 1/2012 | Ramesh | |
| 2013/0300149 | A1 | | 11/2013 | Dao | |

* cited by examiner

*Primary Examiner* — Joseph D Pape

(57) ABSTRACT

An automobile cover is provided. The cover includes an inner sheet, an outer sheet and an insulating material in between. The cover is sectioned into a plurality of panels. The plurality of panels may include at least a front panel sized to cover a windshield of the automobile, a top panel sized to cover a top of the automobile, side panels and a rear panel sized to cover the rear windshield of the automobile. The front panel is joined to the top panel by a seam and the top panel is joined to the rear panel by a seam. The inner and outer sheets may be made of breathable water proof or water resistant fabric. The seams of the present invention allow for easy opening and folding of the cover.

11 Claims, 3 Drawing Sheets

AUTOMOBILE COVER

CROSS-REFERENCE TO RELATED APPLICATION

This application claims the benefit of priority of U.S. provisional application No. 61/895,853, filed Oct. 25, 2013, the contents of which are herein incorporated by reference.

BACKGROUND OF THE INVENTION

The present invention relates to an automobile cover and, more particularly, to a car cover that is easy to use and is useful during winter conditions.

A car cover is used to cover a car to protect the car from the elements. However, current car covers are not suitable for winter conditions. With ice formation, the covers may become attached to the car and cause damage to the windshield and paint. Further, the car covers are not easy to remove when snow freezes, do not help with defrosting the car, do not allow easy access to the doors, and are difficult to unfold and fold. Therefore, it is preferable to use a garage for parking.

As can be seen, there is a need for an improved car cover that is convenient to use.

SUMMARY OF THE INVENTION

In one aspect of the present invention, an automobile cover comprises: an inner sheet; an outer sheet; an insulating material disposed in between the inner sheet and the outer sheet, wherein the automobile cover is sectioned into a plurality of panels comprising at least a front panel sized to cover a front windshield of the automobile, a top panel sized to cover a top of the automobile, and a rear panel sized to cover a rear windshield of the automobile, wherein the front panel is joined to the top panel by a seam and the top panel is joined to the rear panel by a seam.

In one aspect of the present invention, an automobile cover comprises: an inner sheet; an outer sheet; an insulating material disposed in between the inner sheet and the outer sheet; and a heating element attached to the automobile cover, wherein the automobile cover is sized to fit over a front windshield of an automobile.

These and other features, aspects and advantages of the present invention will become better understood with reference to the following drawings, description and claims.

DETAILED DESCRIPTION OF THE INVENTION

Figure 1:
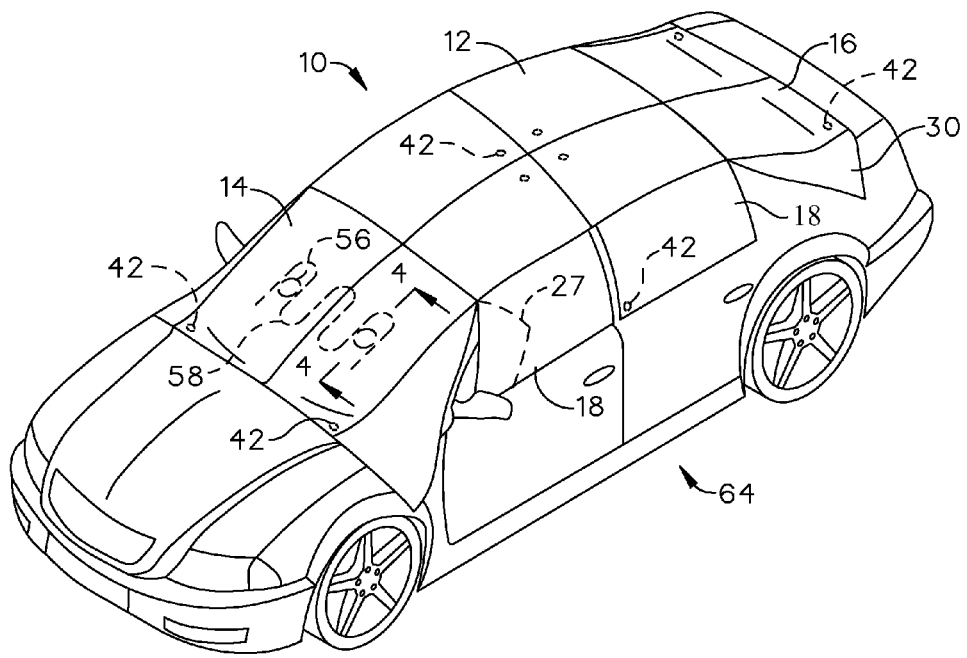
FIG. 1 is a perspective view of the present invention, shown in use.
Figure 2:
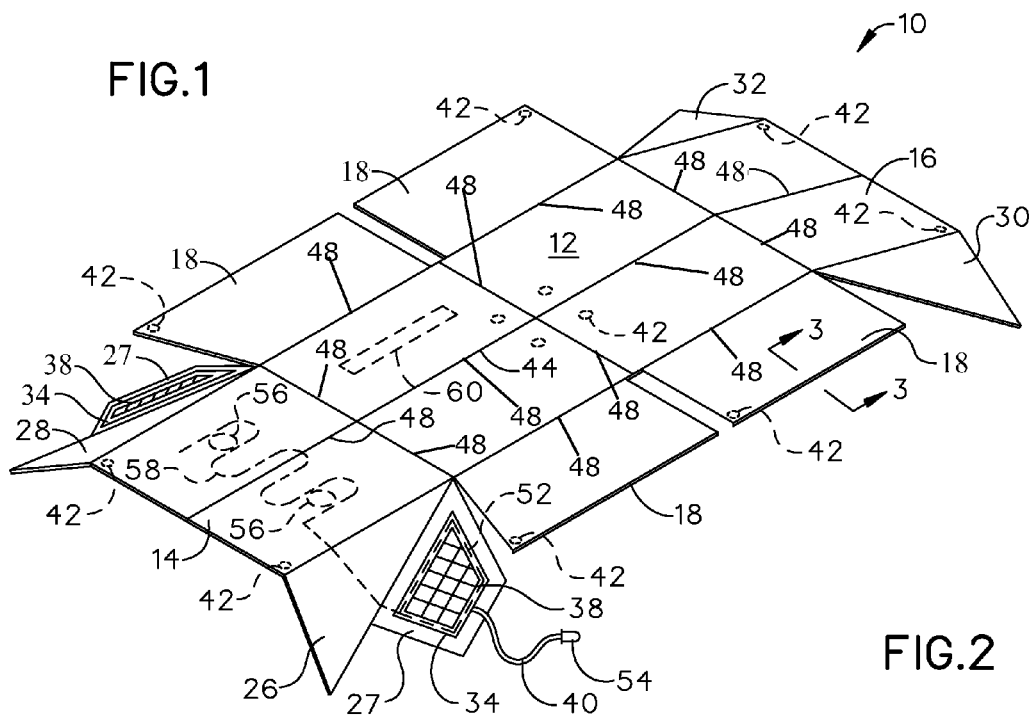
FIG. 2 is a perspective view of the present invention.
Figure 3:
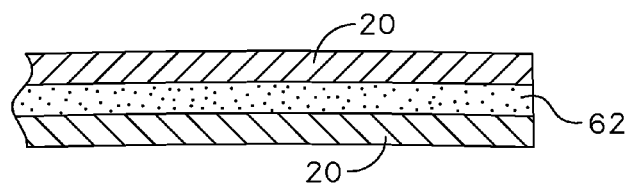
FIG. 3 is a section view of the present invention, taken along line 3-3 in FIG. 2.
Figure 4:
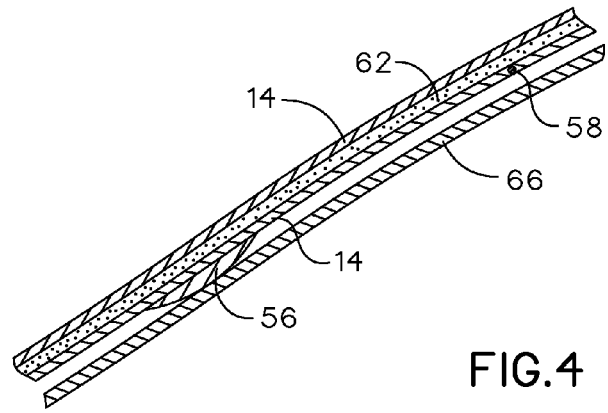
FIG. 4 is a section view of the present invention, taken along line 4-4 in FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an easy to use automobile cover for various weather conditions. The foldable cover may be made of a waterproof material and contains an insulating foam layer in between the inner and outer sheets. The present invention includes foldable panels to easily open and close the cover. The cover of the present invention may also include a heating element to prevent frost and snow cover. As compared to the prior art, the present invention is more versatile and modular, easy to open and fold, adjustable for different conditions by regulating the temperature, and may use a car charger or battery charge to generate heat. In addition, opening and installing the cover is fast as well as removing and folding the cover.

Referring to FIGS. 1 through 7, the present invention includes an automobile cover 10. The cover 10 includes an inner sheet, an outer sheet and an insulating material 62 in between. The cover 10 is sectioned into a plurality of panels. The plurality of panels may include at least a front panel 14 sized to cover a windshield 66 of the automobile 64, a top panel 12 sized to cover a top of the automobile 64, and a rear panel 16 sized to cover the rear windshield of the automobile 64. The front panel 14 is joined to the top panel 12 by a seam 48 and the top panel 12 is joined to the rear panel 16 by a seam 48. The inner and outer sheets may be made of breathable water proof or water resistant fabric. The seams 48 of the present invention allow for easy opening and folding of the cover 10.

In certain embodiments, the present invention may include a plurality of connectors 42 attached to the inner sheet. The connectors 42 releasably secure the cover 10 to the automobile 64. The connectors 42 may include magnets, suction cups, rope, and weights. The connectors 42 may lock the cover 10 to the car and hold it to the body so that wind and other elements do not remove the cover 10.

In certain embodiments, the front panel 14 of the present invention may include two panels joined by a seam 48. The insulation layer of the front panel 14 may prevent the windshield 66 from frosting. In certain embodiments, the front panel 14 may include a first extension flap 26 extending from a first side and a second extension flap 28 extending from a second side. Each of the first and second extension flaps 26, 28 may include an interior flap 27 formed to fit in between a door and a frame of the automobile 64. The flaps 27 may hold the cover 12 in place as well as provide security against theft.

The top panel 12 of the present invention may include four panels joined by a seam 48. In certain embodiments, side panels 18 may be attached to the top panel 12. The side panels may fold over and cover the side windows of the automobile 64. The side panels 18 may protect the side windows from snow and freezing rain. The side panels 18 also include the inner and outer sheets, with the insulating material 62. The side panels 18 are connected to the top panel 12 by a seam 48. In certain embodiments, there may be four side panels 18, one for each door. The side panels 18 may or may not be connected to one another to allow easier access to doors of the automobile 64.

The rear panel 16 may also include two panels joined by a seam 48. The rear panel 16 may attach itself to the back of the automobile 64 and protect the rear windshield from snow and frost. The rear panel 16 contains insulation material 62. In certain embodiments, a first rear extensions flap 30 may extend from the rear panel 16 on a first side, and a second rear extension flap 32 may extend from the rear panel 16 on a second side.

The present invention may further include a heating element 58. Further, the heating element 58 may also include a vibrator. The heating element 56 may be embedded in the front panel 14, side panels 18 and/or rear panel 16. The heating element 58 and vibrator may prevent ice and frosting on the windshield 66. In such embodiments, the interior flaps 27 may include pockets 34 containing batteries 52. A charger cord 40 with a plug 54 may extend from the battery 52 and may connect with an electrical output of the automobile 64. The battery 52 may be used to power the heating element 58. In certain embodiments, the battery 52 may be connected to a solar module 38, which may be exposed to sunlight as well as light from the side window. The solar module 38 may recharge the battery 52 or the battery gets charged from the cigarette lighter electrical output of the automobile 64.

The present invention may further include plastic knobs 56 attached to the inner sheet of the front panel 14. The plastic knobs 56 may prevent the cover 10 from getting stuck to the windshield 66 or any other part of the automobile 64, and also creates a layer of air. The knobs 56 may further prevent frosting from occurring on the windshield 66. The knobs 56 of the present invention may be any plastic piece, such as suction cups, plastic sheets, and the like.

Figure 5:
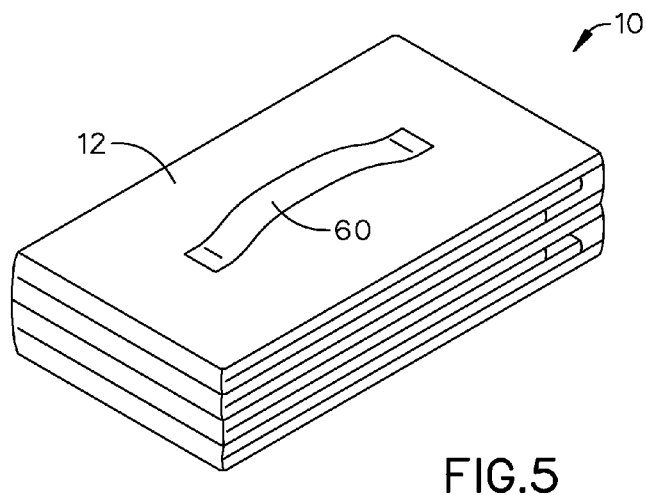
FIG. 5 is a perspective view of the present invention in the folded position.
Figure 6:
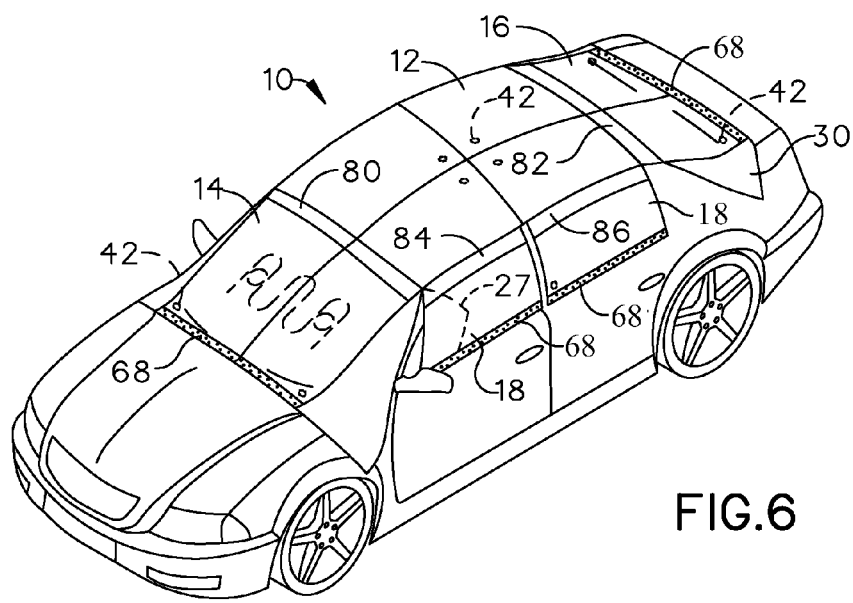
FIG. 6 is a perspective view of an alternate embodiment of the present invention.
Figure 7:
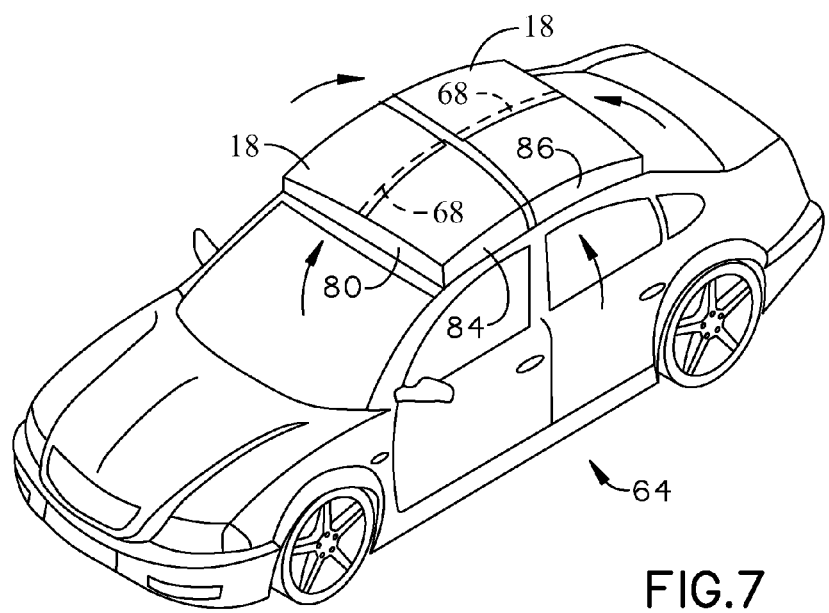
FIG. 7 is a perspective view of the present invention, showing the panels closed into the storage box position.

The seam 48 of the present invention allows for the cover 10 to be easily folded into a compact form, as illustrated in FIG. 5. In certain embodiments, a panel 12 may include a handle 60 to easily carry the compact cover 10. Further, the present invention may include a front box strip 80, a rear box strip 82, a forward side box strip 84 and a rearward side box strip 86 to allow the cover 10 to be easily folded into a box shape. A plurality of fasteners 68 along the outer edge of the cover 10 may secure the present invention in the compressed box shape. Therefore, as illustrated in FIG. 7, the cover 10 may be folded along the box strips 80, 82, 84, 86 and the panels 12, 14, 16 may attach to one another via the fasteners 68. In such embodiments, the cover 10 may be attached to the automobile and folded into a box shape.

The seam 48 may include spring seams 48 to easily fold and unfold. In certain embodiments, the seams 48 of the present invention may include connectors 44 releasably attaching each of the panels together. The connectors 44 may include hook-and-loop fasteners, zippers, snaps, buttons, and rib and slot slide closures, and the like. A modular approach will give the user an opportunity to pick the panel colors, fabric, etc and then attach them. A modular approach also allows the user to have a summer panel set (with fabric and colors that keep the car cool) and a winter panel set (with heating element and material that keep the car warm).

In alternate embodiments of the present invention, a flat bag of salt or any other chemical that prevents formation of ice by decreasing the freezing point or generating heat can be used as an attachment to the cover 10. A second set of flaps can be used to cover the mirrors. The cover 10 may be clear with a transparent insulation pad.

A person using the snow cover may unfold the cover and place the cover over the car. When the person returns to drive the car, he/she removes the car cover, dusts off any snow, and folds it back, along the seams, and carries it using the handles 60. The car cover can also be used to cover other automobiles and non-automotive items in bad weather conditions (i.e. garden furniture). The present invention may also be used to cover other items in normal weather conditions, as well.

It should be understood, of course, that the foregoing relates to exemplary embodiments of the invention and that modifications may be made without departing from the spirit and scope of the invention as set forth in the following claims.

What is claimed is:

1. An automobile cover comprising:
an inner sheet;
an outer sheet;
an insulating material disposed in between the inner sheet and the outer sheet,
wherein the automobile cover is sectioned into a plurality of panels comprising at least a front panel sized to cover a front windshield of the automobile, a top panel sized to cover a top of the automobile, and a rear panel sized to cover a rear windshield of the automobile, wherein the front panel is joined to the top panel by a seam and the top panel is joined to the rear panel by a seam;
a plurality of connectors secured to the inner sheet of the top panel releasably securing the top panel to the top of the automobile; and
a plurality of fasteners along an outer edge of the automobile cover,
wherein the front panel and the rear panel are foldable about the seams such that the plurality of fasteners are releasably connectable to one another to form a folded box shape secured to the top of the automobile.

2. The automobile cover of claim 1, wherein the front panel comprises two panels joined by a seam, the top panel comprises four panels joined by a seam, and the rear panel comprises two panels joined by a seam.

3. The automobile cover of claim 1, wherein the front panel further comprises a first extension flap extending from a first side of the front panel and a second extension flap extending from a second side of the front panel.

4. The automobile cover of claim 3, wherein at least one of the first and second extension flaps comprise an interior flap formed to fit in between a door and a frame of the automobile.

5. The automobile cover of claim 1, further comprising a heating element embedded within the cover.

6. The automobile cover of claim 5, further comprising a battery comprising a cord electrically connectable to an electrical output of the automobile, wherein the battery powers the heating element.

7. The automobile cover of claim 5, further comprising a solar panel disposed on the cover, wherein the solar panel is operatively connected to the heating element, thereby powering the heating element.

8. The automobile cover of claim 1, further comprising plastic knobs attached to the inner sheet of the front panel.

9. The automobile cover of claim 1, wherein the seams comprise a connector releasably attaching each of the panels together.

10. The automobile cover of claim 1, wherein the plurality of panels further comprises side panels attached to the top panel by a seam and sized to cover side windows of the automobile, wherein the side panels are detached from one another.

11. The automobile cover of claim 1, further comprising a vibrator embedded within the cover.

* * * * *